United States Patent [19]

Typpo et al.

[11] 4,134,211
[45] Jan. 16, 1979

[54] CONTACTING CALIPER GAUGE

[75] Inventors: Pekka M. Typpo; Gunnar Wennerberg, both of Cupertino; Tor G. Larsen, Saratoga, all of Calif.

[73] Assignee: Measurex Corporation, Cupertino, Calif.

[21] Appl. No.: 858,813

[22] Filed: Dec. 9, 1977

Related U.S. Application Data

[63] Continuation-in-part of Ser. No. 774,158, Mar. 3, 1977, Pat. No. 4,107,606.

[51] Int. Cl.² ............................................. G01B 7/06
[52] U.S. Cl. .............................. 33/147 L; 33/143 L; 33/149 J
[58] Field of Search ............. 33/143 L, 147 L, 147 N, 33/149 J, 148 H; 324/229, 231

[56] References Cited

U.S. PATENT DOCUMENTS

| | | | |
|---|---|---|---|
| 3,184,855 | 5/1965 | Sebastiani | 33/147 N |
| 3,304,615 | 2/1967 | Ward et al. | 33/143 L |
| 3,528,002 | 9/1970 | Dunlavey | 324/231 |
| 3,828,248 | 8/1974 | Wennerberg | 324/231 |
| 3,892,043 | 7/1975 | Bonikowski | 33/143 L |

Primary Examiner—Richard R. Stearns
Attorney, Agent, or Firm—Ronald L. Yin

[57] ABSTRACT

A contacting caliper gauge measures the thickness of a sheet material moving from the anterior to the posterior of the gauge. The gauge has two matched heads, one to either side of the sheet. Each head has a base, a skid and a bellow. The skid is hinged to the anterior of the base and is between the base and the sheet. The other end of the skid is attached to a bellow. The bellow is also attached to the posterior of the base and is substantially perpendicular to the sheet. A cap is attached to the bellow. The cap has a surface parallel to the sheet near the posterior and rounded near the anterior. The two heads are positioned with the bellow of one in line with the bellow of the other. In a preferred embodiment, the gauge further comprises means for permitting the skid of each head to rotate about an axis which is substantially perpendicular to the hinge near the anterior of the base.

9 Claims, 4 Drawing Figures

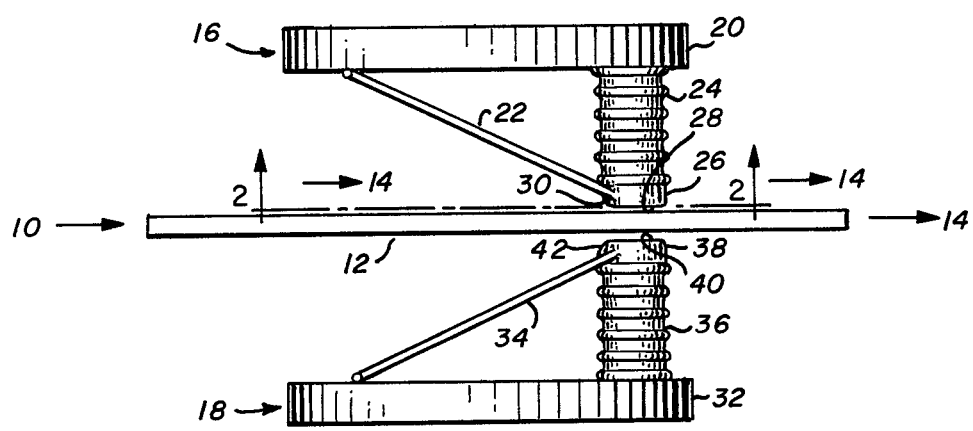
Fig_1
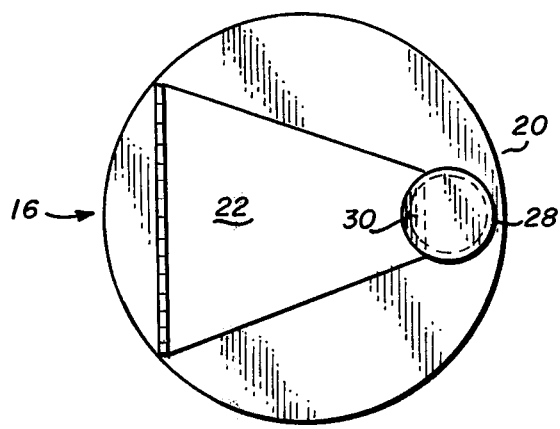
Fig_2
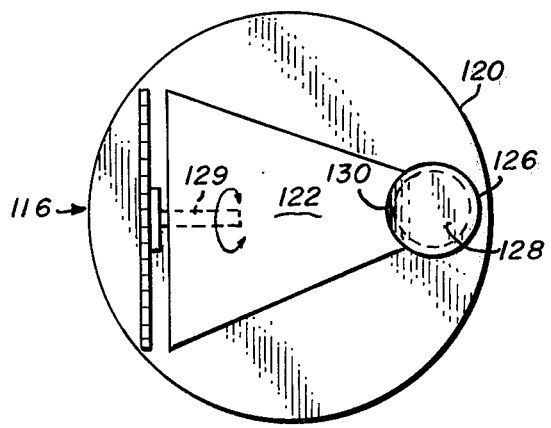
Fig_3
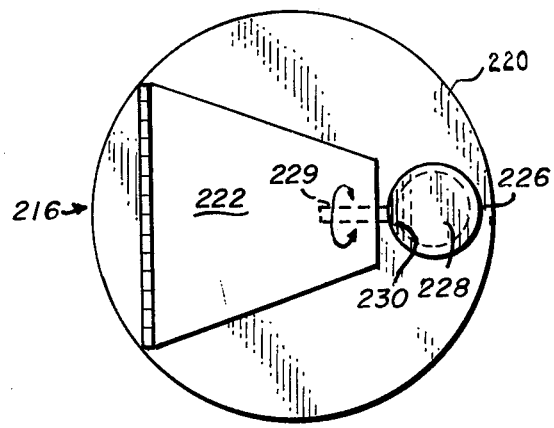
Fig_4

CONTACTING CALIPER GAUGE

BACKGROUND OF THE INVENTION

This application is a continuation-in-part of a copending application Ser. No. 774,158 filed on Mar. 3, 1977, now U.S. Pat. No. 4,107,606, by the present inventors and assigned to the same assignee.

The present invention relates to a contacting caliper gauge and more particularly to a contacting caliper gauge suitable for measuring the thickness of thin sheet material.

Caliper gauges are well known in sensor technology. In general, they are used for a variety of purposes, viz measuring the thickness of sheet material. They have been of two types, i.e. contacting and non-contacting. A typical non-contacting caliper gauge, having air bearings, is disclosed in U.S. Pat. No. 3,528,002. Although non-contacting gauges are in theory suitable for all applications and are superior to contacting ones (superior in the sense of not having the gauge possibly contaminate the sheet through contact), in certain applications contacting gauges must be employed. For example, in the paper industry, because there is a certain amount of compressibility in the paper, a measurement of the paper by a contacting gauge would differ from a measurement of the paper by a non-contacting gauge. The United States paper manufacturers have formed an association (TAPPI) to promote uniform standards for the paper industry. The TAPPI standard is that measurement of thickness must be based upon results obtained from a contacting gauge at a certain pressure level. A typical contacting gauge is disclosed in U.S. Pat. No. 3,828,248. However, heretofore all contacting caliper gauges have suffered from the shortcoming that for very thin sheet material, such as tissue, the gauge has a tendency to tear the sheet.

SUMMARY OF THE INVENTION

A contacting caliper gauge for measuring the thickness of a sheet material, moving in a direction from the anterior to the posterior of the gauge, comprises a first base to one side of the sheet. A first skid is between the first base and the sheet and is hinged to the first base near the anterior. A first elastic means connects the other end of the first skid to the posterior of the first base in a direction substantially perpendicular to the surface of the sheet. A first cap is attached to the end of the first elastic means. The first cap has a surface substantially parallel to the sheet near the posterior and rounded near the anterior. A second base is to the other side of the sheet. A second skid is between the second base and the sheet and is hinged to the second base near the anterior. A second elastic means connects the other end of the second skid to the posterior of the second base in a direction substantially perpendicular to the surface of the sheet. A second cap is attached to the end of the second elastic means. The second cap has a surface substantially parallel to the sheet near the posterior and rounded near the anterior. The first elastic means and the second elastic means are substantially in linear relationship.

BRIEF DESCRIPTION OF THE DRAWINGS

FIG. 1 is a schematic side view of the caliper gauge of the present invention.

FIG. 2 is a plan view taken along 2—2 of the first head of the gauge of FIG. 1.

FIG. 3 is a plan view of a first head of a preferred embodiment of the present invention.

FIG. 4 is a plan view of a first head of another preferred embodiment of the present invention.

DETAILED DESCRIPTION OF THE DRAWINGS

Referring to FIG. 1, there is shown a schematic side view of a caliper gauge 10 with a sheet material 12. The sheet material 12 moves in a direction shown by arrows 14. The sheet material 12 moves from the anterior of the gauge 10 to the posterior of the gauge 10. The gauge 10 comprises a first head 16 to one side of the sheet material 12 and a second head 18 to the other side of the sheet material 12. The heads 16 and 18 are mechanically identical.

The first head 16 comprises a first base 20. A first skid 22 is between the first base 20 and the sheet material 12. One end of the first skid 22 is hinged to the first base 20 near the anterior of the gauge 10. A first bellow 24 connects the other end of the first skid 22 to the first base 20 near the posterior of the gauge 10. The bellow 24 is substantially perpendicular to the sheet material 12. A first cap 26 is attached to one end of the first bellow 24 and is adjacent said other end of said first skid 22. The first cap 26 has a surface 28 which is substantially parallel to the sheet material 12 near the posterior and has a rounded portion 30 near the anterior.

The second head 18 is identical in mechanical construction to the first head 16. The second head 18 comprises a second base 32, a second skid 34 and a second bellow 36 all connected in a manner similar to that described for the first base 20, the first skid 22 and the first bellow 24 of the first head 16. Similar to the first cap 26 attached to the first bellow 24, there is a second cap 38 attached to the second bellow 36. The second cap 38 also has a surface 40 which is substantially parallel to the sheet material 12 near the posterior and has a rounded portion 42 near the anterior. The first head 16 and the second head 18 are positioned such that the first bellow 24 and the second bellow 36 are substantially in a linear relationship. In the operation of the gauge 10, the first cap 26 and the second cap 38 would be in contact with the sheet material 12 with the first cap 26 directly opposite the second cap 38.

In general, any elastic means can be used in place of the first bellow 24 or the second bellow 36. The bellows are preferred because electronics to detect the thickness of the sheet material 12 may be placed in them. Such electronics can be a magnetic coil in the first bellow 24 with the second cap 38 comprising of a magnetically susceptible material, such as iron or ferrite. Such electronics is well known and is fully described in U.S. Pat. No. 3,828,248. Apart from the material constraints imposed by the electronics of the system, the bases 20 and 32 and the skids 32 and 34 may be of any suitable material, such as metal or plastic.

There are a number of advantages of the gauge 10 which makes it suited to measure the thickness of thin sheet material, such as tissue. The first advantage is that in the gauge 10 the only elements which respond to the variation in the thickness of the sheet material 12 are the bellows 24 and 36, i.e. through contraction or elongation the bellows 24 and 36 would respond to different thickness of the sheet material 12. The bellows 24 and 36 are much less massive than the entire first base 20 or the second base 32. The lighter, less massive moving elements, viz the bellows 24 and 36, means that there is less likelihood of snags and tears during the measurement process when there is a thickness variation.

Another advantage of the gauge 10 is the combination of the rounded portion 30 of the first cap 26 and the rounded portion 42 of the second cap 38. Together they form a curve guide for the entrance of the sheet material 12 for contact by the caps 26 and 38, respectively. This, too, reduces the probability of tearing. Finally, there is the action of the combination of the bellows 24 and 36 and the skids 22 and 34. The probability of tearing is greatest when there is an increase in the thickness of the sheet material 12. In that event, the bellows 24 and 36 would contract and at the same time the skids 22 and 34 would also move to create a more narrow v-shaped entrance to lessen even further the possibility of snagging or tearing.

Referring to FIG. 3, there is shown a plan view of a first head 116 of a preferred embodiment of the present invention. The first head 116 is positioned over the sheet material 12 (not shown) just like the first head 16 of FIG. 1, i.e. the sheet material 12 moves from the anterior of the first head 116 to the posterior in a direction shown by the arrow 114. The first head 116 comprises a first base 120 and a first skid 122. One end of the first skid 122 is hinged to the first base 120 near the anterior of the first head 116. A first bellow (not shown) connects the other end of the first skid 122 to the first base 120 near the posterior of the first head 116. The first head 116 is positioned over the sheet material 12 such that the first bellow is substantially perpendicular to the sheet material 12. A first cap 126 is attached to one end of the first bellow and is adjacent said other end of said first skid 122. The first cap 126 has a surface 128 which is substantially parallel to the sheet material 12 near the posterior and has a rounded portion 130 near the anterior. Thus far, the first base 120, the first skid 122, the first bellow and the first cap 126 are similar to the first base 20, the first skid 22, the first bellow 24 and the first cap 26 respectively that are shown in FIG. 2 and described, and cooperate to function in substantially the same manner. In addition, the first head 116 further comprises a first pin 129. The first pin 129 is positioned substantially perpendicular to the one end of the first skid 122. One end of the first pin 129 is attached to the first skid 122. The other end of the first pin 129 is hinged to the first base 120 near the anterior. The first pin 129 is attached to the first skid 122 in a manner which permits the first skid 122 to rotate about the first pin 129. This can be accomplished by drilling a hole in the first skid 122 and positioning the first pin 129 in the hole. To permit ease of motion, of course, the hole must be slightly larger than the diameter of the first pin 129. A gauge of the present invention employing the first head 116 of the preferred embodiment of FIG. 3 would, of course, use two identical heads, each positioned on either side of the sheet material 12, just as that shown and described in FIG. 1.

Referring to FIG. 4, there is shown a plan view of a first head 216 of another preferred embodiment of the present invention. The first head 216 is positioned over the sheet material 12 (not shown) just like the first head 16 of FIG. 1, i.e. the sheet material 12 moves from the anterior of the first head 216 to the posterior in a direction shown by the arrow 214. The first head 216 comprises a first base 220 and a first skid 222. One end of the first skid 222 is hinged to the first base 220 near the anterior of the first head 216. A first bellow (not shown) connects the other end of the first skid 222 to the first base 220 near the posterior of the first head 216. The first head 216 is positioned over the sheet material 12 such that the first bellow is substantially perpendicular to the sheet material 12. A first cap 226 is attached to one end of the first bellow and is adjacent said other end of said first skid 222. The first cap 226 has a surface 228 which is substantially parallel to the sheet material 12 near the posterior and has a rounded portion 230 near the anterior. Thus far, the first base 220, the first skid 222, the first bellow and the first cap 226 are similar to the first base 20, the first skid 22, the first bellow 24 and the first cap 26, respectively, that are shown in FIG. 2 and described, and cooperate to function in substantially the same manner. In addition, the first head 216 further comprises a first pin 229. The first pin 229 is positioned substantially perpendicular to the one end of the first skid 222. One end of the first pin 229 is attached to the first skid 222. The other end of the first pin 229 is attached to the first cap 226. The first pin 229 is attached to the first skid 222 in a manner which permits the first skid 222 to rotate about the first pin 229. This can be accomplished by drilling a hole in the first skid 222 and positioning the first pin 229 in the hole. To permit ease of motion, of course, the hole must be slightly larger than the diameter of the first pin 229. A gauge of the present invention employing the first head 216 of the preferred embodiment of FIG. 4 would, of course, use two identical heads, each positioned on either side of the sheet material 12 — just as that shown and described in FIG. 1.

The additional advantage of the embodiments shown in FIGS. 3 and 4, is that the skid 122 or 222 has another degree of freedom. Mechanically, this places less strain and wear on the cap 126 or 226 as it moves over the sheet material 12. This permits longer wear by the caliper gauge of the present invention.

What is claimed is:

1. A contacting caliper gauge for measuring the thickness of a moving sheet material, said sheet material moving from the anterior to the posterior of the gauge, said gauge comprises:
    a first base to one side of said sheet;
    a first skid between said first base and said sheet material, said skid having one end hinged to said base near the anterior portion thereof;
    a first connecting means for elastically connecting the other end of said first skid to the posterior portion of said first base, said means defining an axis which is substantially perpendicular to the surface of said sheet;
    a first cap attached to said first connecting means adjacent said other end of the associated skid, said cap has a flat surface substantially parallel to said sheet on the posterior end thereof and a rounded surface near the anterior portion thereof;
    a second base to the other side of said sheet;
    a second skid between said second base and said sheet material, said skid having one end hinged to said second base near the anterior portion thereof;
    a second connecting means for elastically connecting the other end of said second skid to the posterior portion of said second base, said means defining an axis which is substantially perpendicular to the surface of said sheet and is substantially in linear alignment with said first connecting means; and
    a second cap attached to said second connecting means adjacent said other end of the associated skid, said cap has a flat surface substantially parallel to said sheet on the posterior end thereof, and a rounded surface near the anterior portion thereof.

2. The gauge of claim 1 further comprising a first pivot means for permitting said first skid to pivot about an axis which is substantially perpendicular to the hinge axis of the one end of said first skid.

3. The gauge of claim 2 further comprising a second pivot means for permitting said second skid to pivot about an axis which is substantially perpendicular to the hinge axis of the one end of said second skid.

4. The gauge of claim 3 wherein said first connecting means is a first bellow.

5. The gauge of claim 4 wherein said second connecting means is a second bellow.

6. The gauge of claim 3 wherein said first pivot means is a first pin, said first pin positioned substantially perpendicular to the hinge axis of said one end of said first skid, one end of said first pin pivotally connected to said first skid, the other end of said first pin hinged to said first base.

7. The gauge of claim 6 wherein said second pivot means is a second pin, said second pin positioned substantially perpendicular to the hinge axis of said one end of said second skid, one end of said second pin pivotally connected to said second skid, the other end of said second pin hinged to said second base.

8. The gauge of claim 3 wherein said first pivot means is a first pin, said first pin positioned substantially perpendicular to the hinge axis of said one end of said first skid, one end of said first pin pivotally connected to said first skid, the other end of said first pin connected to said first cap.

9. The gauge of claim 8 wherein said second pivot means is a second pin, said second pin positioned substantially perpendicular to the hinge axis of said one end of said second skid, one end of said second pin pivotally connected to said second skid, the other end of said second pin connected to said second cap.

* * * * *